US008235658B2

(12) United States Patent
Guemmer (10) Patent No.: US 8,235,658 B2
(45) Date of Patent: Aug. 7, 2012

(54) FLUID FLOW MACHINE INCLUDING ROTORS WITH SMALL ROTOR EXIT ANGLES

(75) Inventor: Volker Guemmer, Mahlow (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 715 days.

(21) Appl. No.: 12/379,789

(22) Filed: Feb. 27, 2009

(65) Prior Publication Data

US 2009/0274554 A1 Nov. 5, 2009

(30) Foreign Application Priority Data

Feb. 28, 2008 (DE) .......................... 10 2008 011 645

(51) Int. Cl.
*F04D 29/44* (2006.01)
*F04D 29/54* (2006.01)

(52) U.S. Cl. ................................ 415/199.5; 416/241 R (58) Field of Classification Search ............... 415/199.5; 416/241 R
See application file for complete search history.

(56) References Cited

U.S. PATENT DOCUMENTS 6,077,036 A * 6/2000 Heffron et al. ................ 415/115
2008/0131272 A1* 6/2008 Wood et al. ................ 415/199.5

FOREIGN PATENT DOCUMENTS

| DE | 25 52 073 | 5/1977 |
| EP | 0 441 097 | 8/1991 |
| EP | 1 186 747 | 3/2002 |
| GB | 609 322 | 9/1948 |
| GB | 944 166 | 12/1963 |
| GB | 2 085 976 | 5/1982 |
| WO | 2008/026788 | 3/2008 |

OTHER PUBLICATIONS

European Search Report dated Mar. 2, 2012 from counterpart foreign application.

* cited by examiner

*Primary Examiner* — Chuong A Luu
*Assistant Examiner* — Nga Doan
(74) *Attorney, Agent, or Firm* — Timothy J. Klima; Shuttleworth & Ingersoll, PLC (57) ABSTRACT

A fluid flow machine includes at least one rotor blade row designed for high work coefficients, which—in its center section and/or averaged over the blade height—provides for an essentially swirl-free relative outflow. The respective rotor, in its trailing edge area, is essentially orientated in meridional direction, which essentially corresponds to the meridional flow direction.

18 Claims, 9 Drawing Sheets

$$(1) \quad \varepsilon_{1G} = \frac{1}{21} \sum_{i=1}^{21} \varepsilon_{1i}$$

$$(2) \quad \varepsilon_{2G} = \frac{1}{21} \sum_{i=1}^{21} \varepsilon_{2i}$$

$$(3) \quad \varepsilon_{1M} > 50° \quad \text{and/or} \quad \varepsilon_{1G} > 50°$$

$$(4) \quad 5° < \varepsilon_{2M} < 15° \quad \text{and/or} \quad 5° < \varepsilon_{2G} < 15°$$

Fig. 8:

FLUID FLOW MACHINE INCLUDING ROTORS WITH SMALL ROTOR EXIT ANGLES

This application claims priority to German Patent Application DE102008011645.9 filed Feb. 28, 2008, the entirety of which is incorporated by reference herein.

The present invention relates to fluid flow machines, such as blowers, compressors, pumps and fans of the axial and semi-axial type with gaseous or liquid working medium (fluid). The fluid flow machine includes one or several stages. Each stage has a rotor and a stator. The rotor includes a number of blades which are connected to the rotating shaft of the machine and impart energy to the working medium. The rotor can be shrouded or shroudless at the outer blade end. The stator includes a number of stationary vanes which can be provided with a fixed or free blade end on the hub side and on the casing side. The rotor drum and the blading are enclosed by a casing. The machine may feature a stator upstream of the first rotor (inlet guide vane assembly). Instead of being fixed, the stators can be variable and provided with a spindle accessible from the outside of the annulus duct to accomplish this variation.

The fluid flow machine may alternatively feature a bypass configuration such that the single-flow annulus duct divides into two concentric annuli behind a certain blade row, with each of these annuli housing at least one further blade row.

Figure 2:
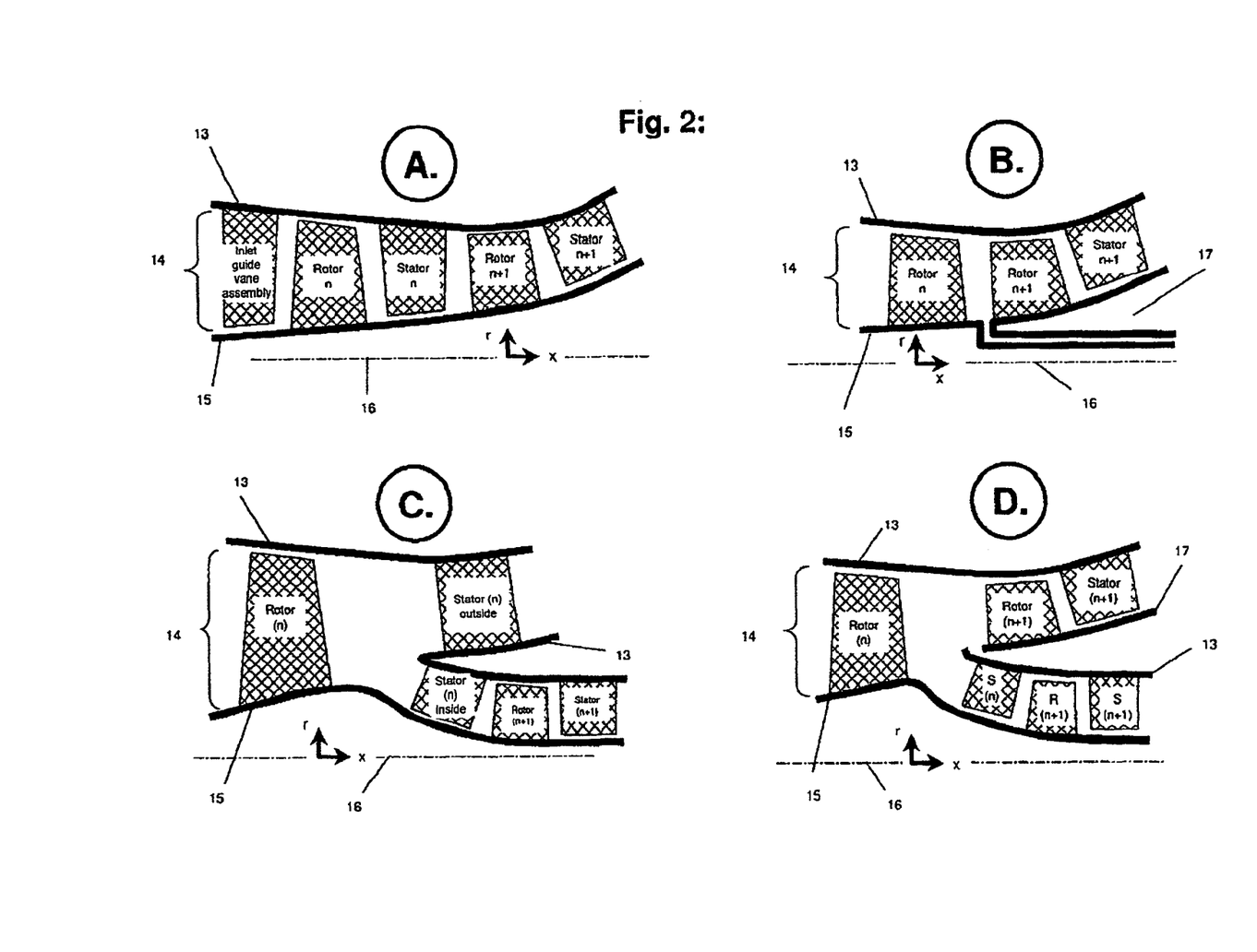
FIG. 2 is a schematic representation of fluid flow machines in accordance with the present invention.

Furthermore, multi-stage types of the fluid flow machine in accordance with the present invention may have two counter-rotating shafts, with the direction of rotation of the rotor blade rows alternating between stages. Here no stators exist between counter-rotating rotors. FIG. 2 shows, by way of example, four configurations of the fluid flow machine which are feasible in accordance with the present description.

The stability limit of fluid flow machines, such as blowers, compressors, pumps and fans, decisively depends upon the selection of the work coefficient (specific enthalpy transformation $\delta h$ relative to the square of the rotor blade velocity $U^2$). For this reason, a work coefficient of 0.5 is normally not exceeded.

Very high rotor blade velocities are to be selected for the high stage pressure ratios required today which may lead to a relative inflow at the rotor in the supersonic range, if applicable. In this case, the state of the art provides for rotor blade profiles with high stagger angle, low profile camber and high relative swirl component of the rotor outflow velocity.

These properties involve a steeply inclined stage characteristic (stage pressure ratio versus mass flow). Accordingly, a minor decrease of the mass flow leads to a considerable increase of the stage pressure ratio which, in the case of multi-stage fluid flow machines, conduces to a rapidly increasing detuning of the individual stages.

The distance between the operating line and the stability limit in the characteristics of the fluid flow machine that is required to ensure safe operation must, therefore, be very large. For an engine compressor, for example, 25 to 30 percent of the design pressure ratio is to be provided as stability margin.

Designs according to the state of the art reflect work coefficients below 0.5. Compliance with this design criterion requires very high rotor blade velocities and/or a large number of stages, respectively, to yield high pressure ratios of the fluid flow machine. In addition, a great degree of stability margin is to be provided.

Therefore, in high-pressure compressors of aircraft engines, for example, rotor inflow mach numbers significantly beyond 1, at correspondingly high rotor blade velocities, are permitted, with the consequence of high flow losses. In such a compressor, the total characteristic, as well as each individual stage characteristic, is very steep, resulting in severe stage detuning in part-load operation. The number of high-pressure compressor stages nevertheless is always 6 or more.

A slightly different problem applies to the booster stages of a two-shaft engine. Due to the direct speed coupling of the booster stages to the fan, the rotor blade velocity available to them is only low, as a result of which, according to the state of the art, an extremely high number of booster stages is required for a small increase of the pressure ratio.

Figure 1:
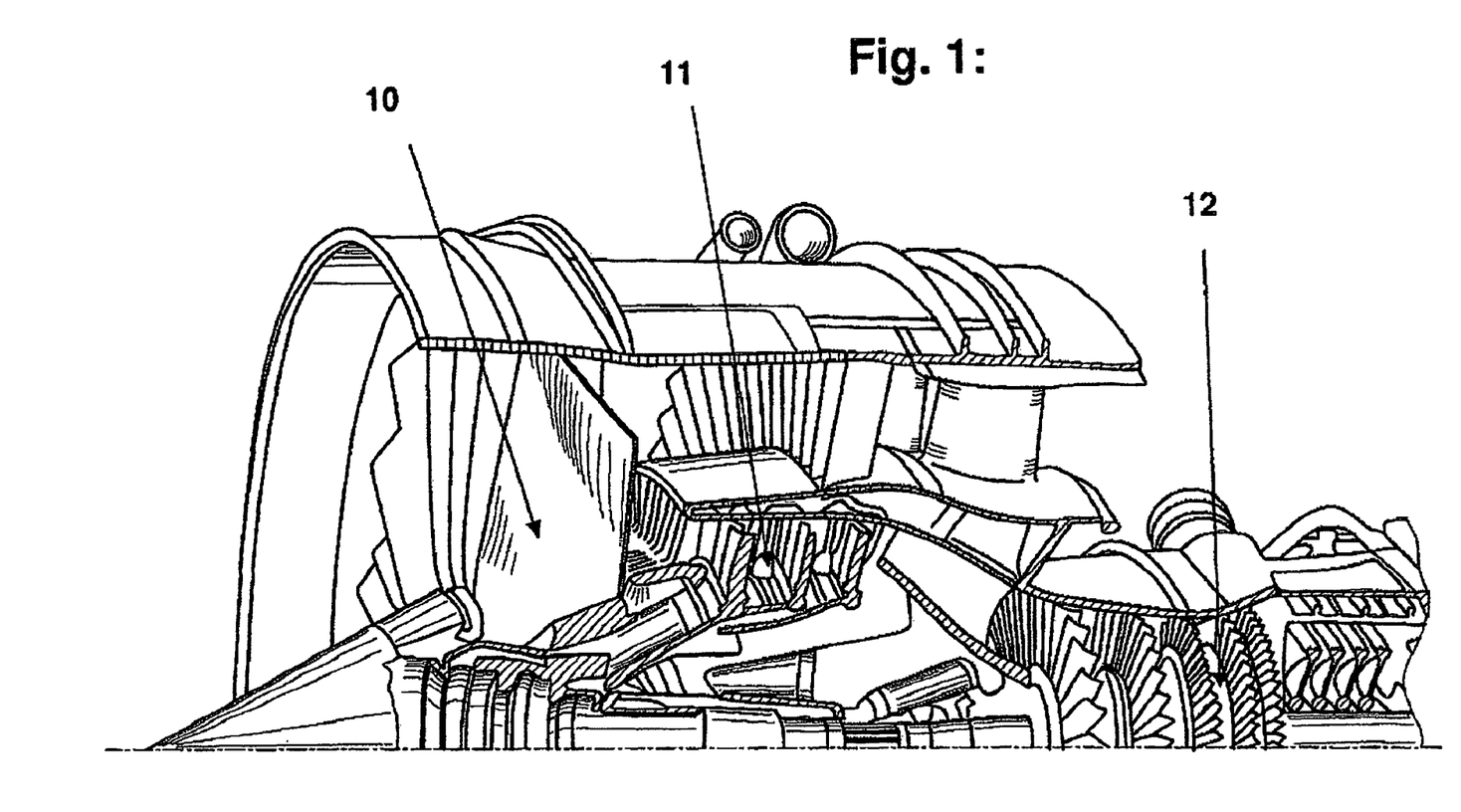
FIG. 1 shows an example for a compressor system (fluid flow machine) of an aircraft engine in the medium-thrust category (state of the art)

FIG. 1 here shows the state of the art on the example of a compressor system of an aircraft engine in the medium-thrust category. The engine includes fan 10, booster 11 and high pressure compressor 12.

A broad aspect of the present invention is to provide a fluid flow machine of the type specified at the beginning above, which while avoiding the disadvantages of the state of the art and maintaining sufficient stability, enables a highly efficient increase of the realizable value of the work coefficient by use of a specific rotor configuration.

The present invention, in detail, thus relates to a fluid flow machine with at least one rotor blade row designed for a work coefficient significantly exceeding the state of the art, which—in its center section and/or averaged over the blade height—provides for low swirl of the absolute inflow on the one hand and on the other hand produces low swirl of the relative outflow.

A low swirl of the relative outflow is reached in accordance with the present invention in that the respective rotor in the area of its trailing edge essentially features an orientation diverging only slightly from the meridional flow direction, i.e. from the swirl free state.

The mean or averaged exit metal angle of the rotor blade preferably ranges between 5 and 20 degrees.

The present invention, more particularly, relates to the application of the rotor design to the first rotor blade row arranged in flow direction downstream of the fan in the core flow section of an aircraft engine. Furthermore the present invention relates to the application of the rotor design concept to several stages of the fluid flow machine, following each other in the direction of flow.

In the state of the art, no mention is hitherto made of the possibility of decreasing the required degree of stability margin and simultaneously increasing the realizable value of the work coefficient just by specifically selecting the flow angles before and behind the rotor, and thus the design of the rotor blade.

The present invention is more fully described in light of the accompanying FIGS. 1 to 8 showing preferred embodiments.

FIG. 2 shows schematic representations of fluid flow machines in accordance with the present invention, which machines can include casing 13, annulus duct 14, first rotor drum (hub) 15, machine axis 16 and second rotor drum (hub) 17.

Figure 3:
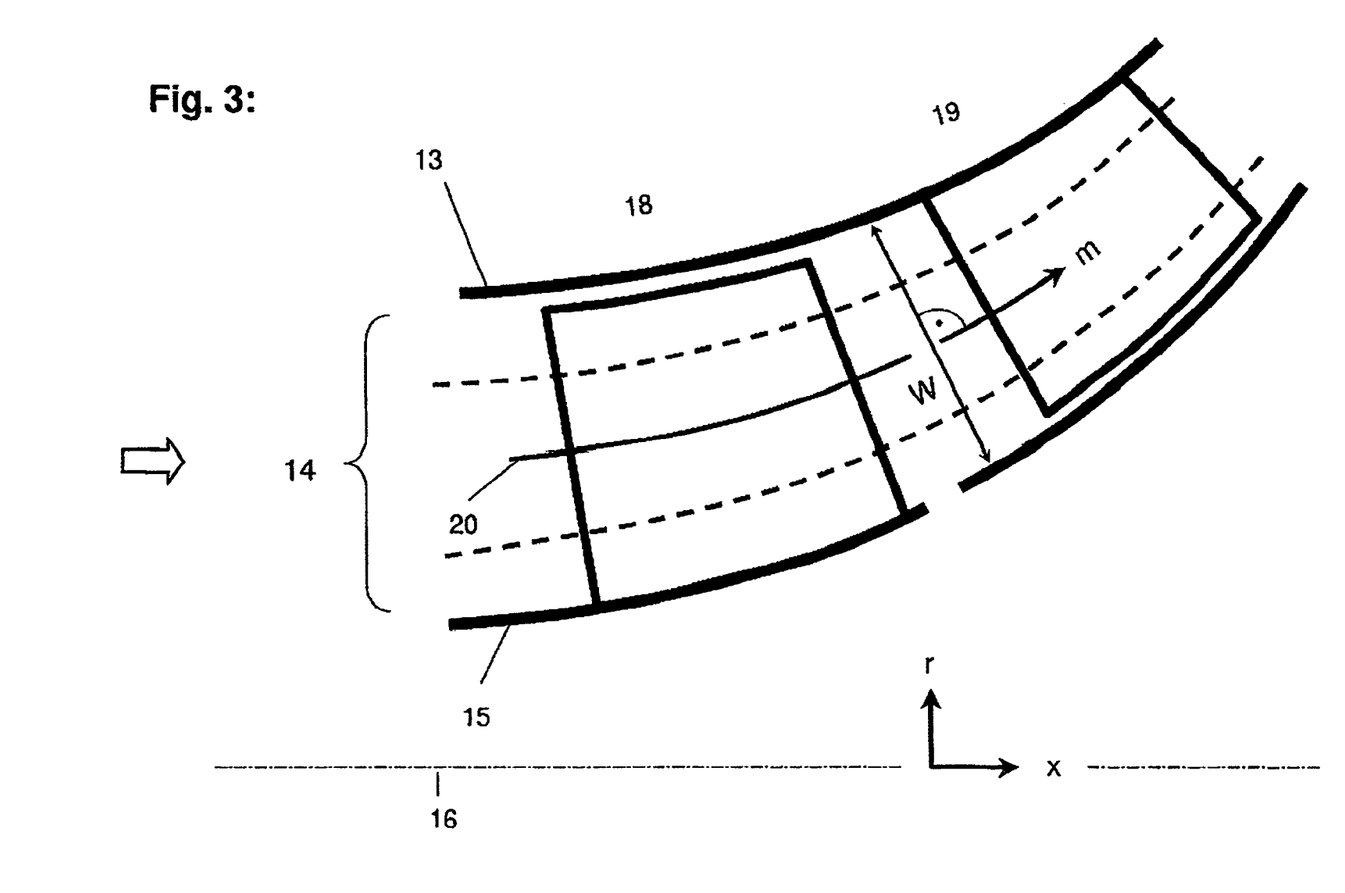
FIG. 3 shows the definition of meridional flow lines and flow line profile sections.

FIG. 3 provides a precise definition of the meridional flow lines and the flow line profile sections. The center meridional flow line m is established by the geometrical center of the annulus duct 14. If a perpendicular is erected at any point of the center flow line, the development of the annulus duct width W along the flow path on the one hand and a number of perpendiculars on the other hand will be obtained, by which further meridional flow lines, with the same relative subdivision in the direction of the duct height, are established. The intersection of a meridional flow line with a blade establishes a flow line profile section, the intersection of the center meridional flow line with a blade establishes the so-called center section.

Figure 4A:
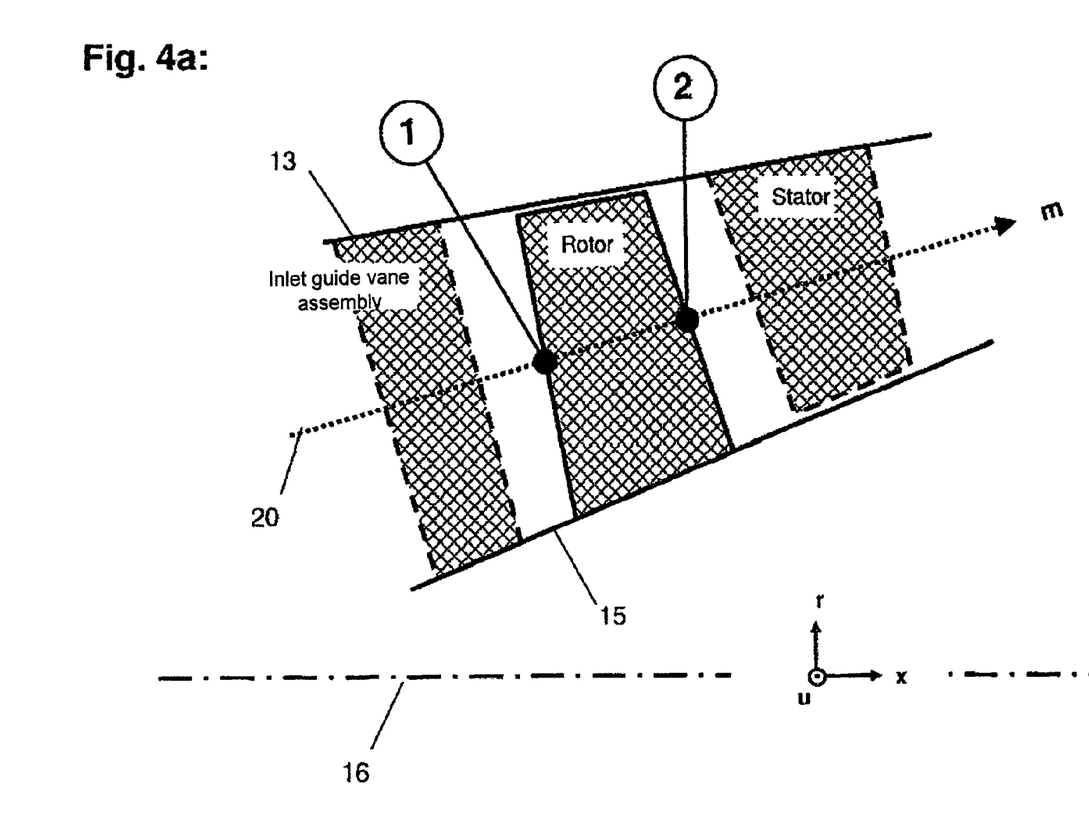
FIG. 4a shows the rotor of a fluid flow machine in meridional section.

FIG. 4a shows a part of a fluid flow machine in meridional section, here schematically illustrated as an arrangement of inlet guide vane assembly (stator), rotor and stator. Also shown is the center meridional flow line 20 which indicates the center section of the machine and whose intersection with the rotor edges is marked by the points 1 and 2. The present invention is related to aerodynamic and geometric conditions in the leading and trailing edge plane of the respective rotor. The invention-relevant quantities are represented as average values along the rotor blade height and directly in the center section (on the center meridional flow line 20).

Figure 4B:
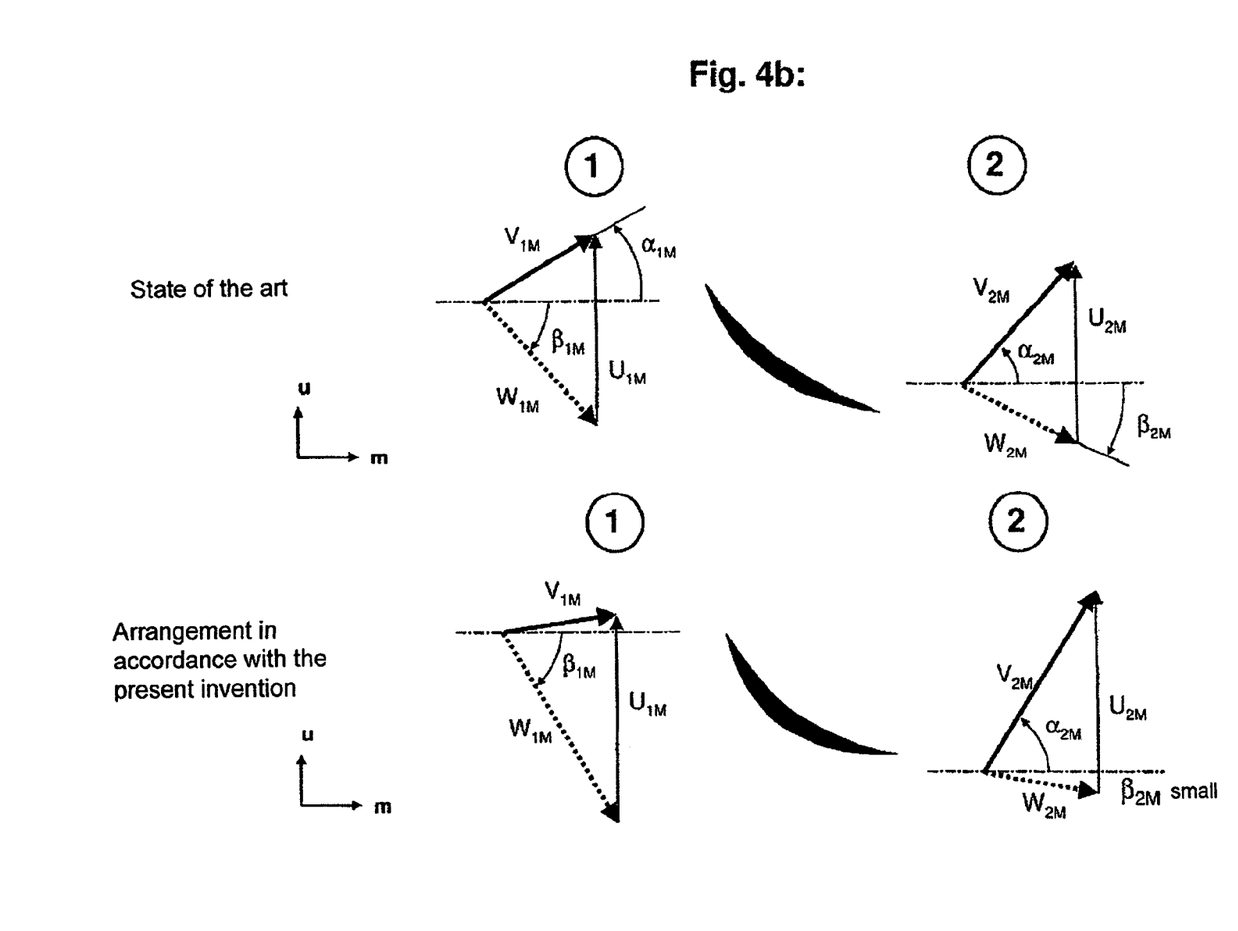
FIG. 4b shows the arrangement of the velocity triangles and of the center section profile of the rotor according to the state of the art and the present invention.

In FIG. 4b, for clarification of the solution according to the present invention, the rotor blade geometry and the flow velocity vectors in the rotor center section are considered. Shown are the velocity triangles (vectors) at point 1 before the rotor, the center section profile of the rotor and the velocity triangles (vectors) at point 2 behind the rotor.

The upper portion of the illustration shows an arrangement according to the state of the art. Characteristic here is a rotor inflow at the absolute velocity $V_{1M}$ under the absolute inflow angle $\alpha_{1M}$. Angle $\alpha_{1M}$ is usually distinctly larger than zero and in rare cases equal to zero. With the circumferential velocity $U_{1M}$, this results in a relative inflow at the velocity $W_{1M}$ under the relative inflow angle $\beta_{1M}$. The rotor center section profile has a moderately pronounced camber and deflects the flow from $W_{1M}$ to $W_{2M}$. The resultant relative outflow angle $\beta_{2M}$, as a particular characteristic, remains significantly larger than zero, for example 30 degrees.

The bottom portion of the illustration shows an inventive arrangement with a rotor featuring a small exit angle. The rotor inflow is at the absolute velocity $V_{1M}$ under the absolute inflow angle $\alpha 1$. Angle $\alpha_{1M}$ amounts to a small value. With the circumferential velocity $U_{1M}$, this results in a relative inflow at the velocity $W_{1M}$ under the relative inflow angle $\beta_{1M}$. The rotor center section profile has a very pronounced camber and strongly deflects the flow from $W_{1M}$ to $W_{2M}$ (extreme flow deflection). The resultant relative outflow angle $\beta_{2M}$ is small.

Now, the inventive form of the velocity triangles is to be applied to geometrical features of the rotor blade which can be used as decisive design criterion.

Figure 5:
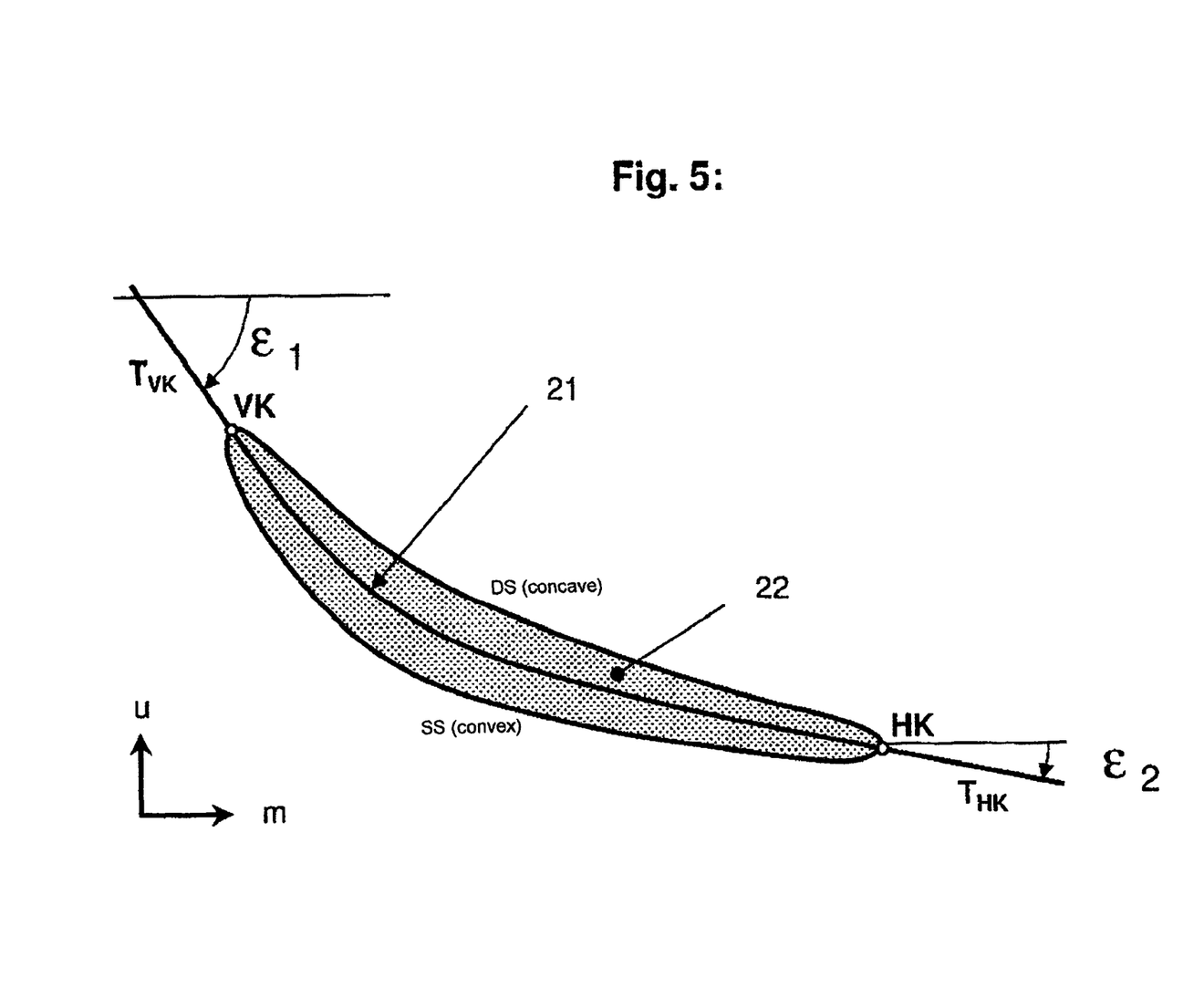
FIG. 5 shows the definition of the metal angles at the leading and trailing edges of a rotor blade or stator vane section.

FIG. 5 firstly shows, in schematic representation, the definition of the metal angles at the leading and trailing edges of a rotor blade or a stator vane. Shown is a flow line profile section of the blade on a meridional flow surface (u-m plane). To find the metal angles, the profile skeleton line, the center line between the pressure side (DS) and the suction side (SS) of the profile, must be determined in the plane of the blade profile section. The tangents $T_{VK}$ and $T_{HK}$ drawn to the profile skeleton line in the leading and trailing edge points (VK, HK) quantify the orientation of the profile. The entry metal angle $\epsilon_{1M}$ is finally established between the tangent $T_{VK}$ and the meridional direction m, the exit metal angle $\epsilon_{2M}$ between the tangent $T_{VK}$ and the meridional direction m.

Figure 6:
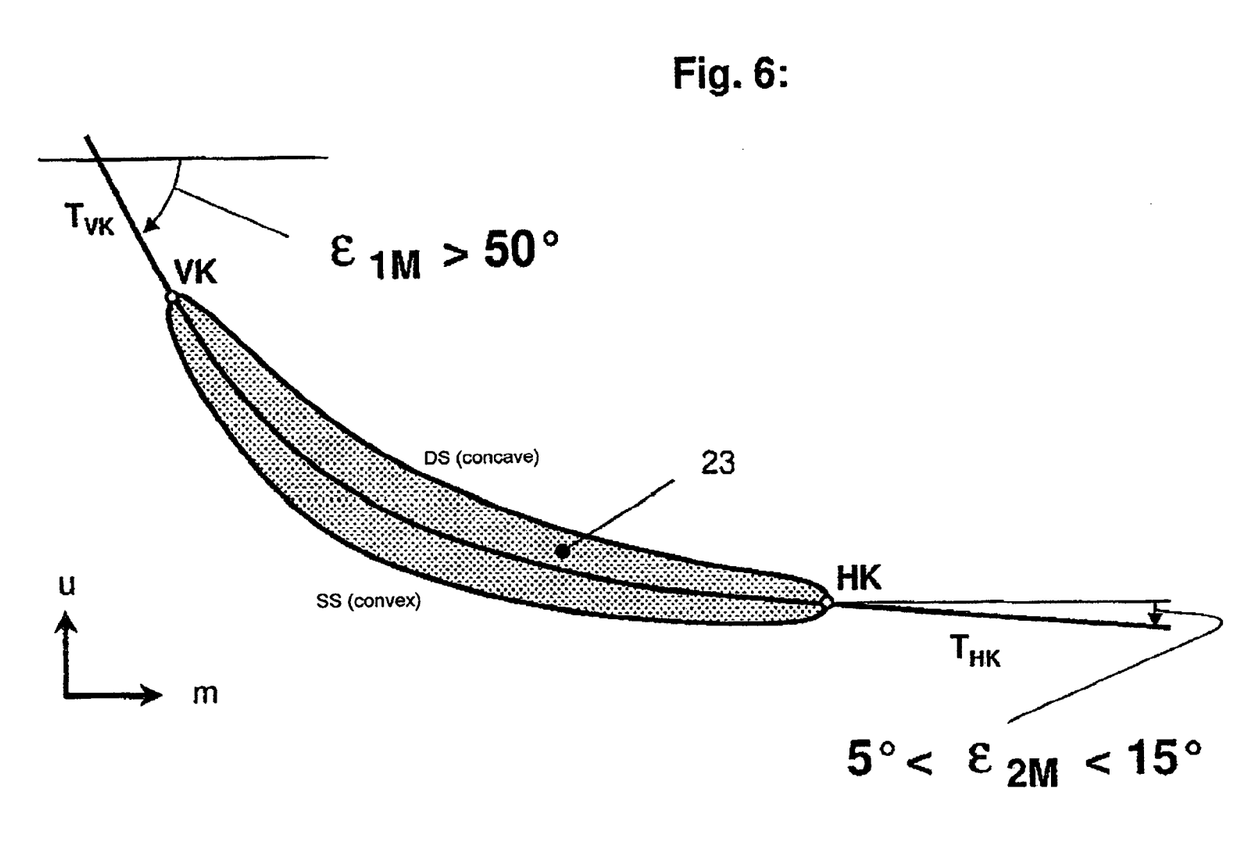
FIG. 6 shows the definition of the metal angles of the rotor in the flow line center section according to the present invention, rotor with small exit angle.

FIG. 6 now shows the center section of a rotor with dimensions for the metal angles $\epsilon_{1M}$ and $\epsilon_{2M}$. Accordingly, as per the present invention, a high entry metal angle $\epsilon_{1M}$ of more than 50 degrees is to be combined with an exit metal angle $\epsilon_{2M}$ specified between 5 and 15 degrees. This leads to a deflection or camber, respectively, in the center section of the rotor which is far beyond the state of the art.

Figure 7:
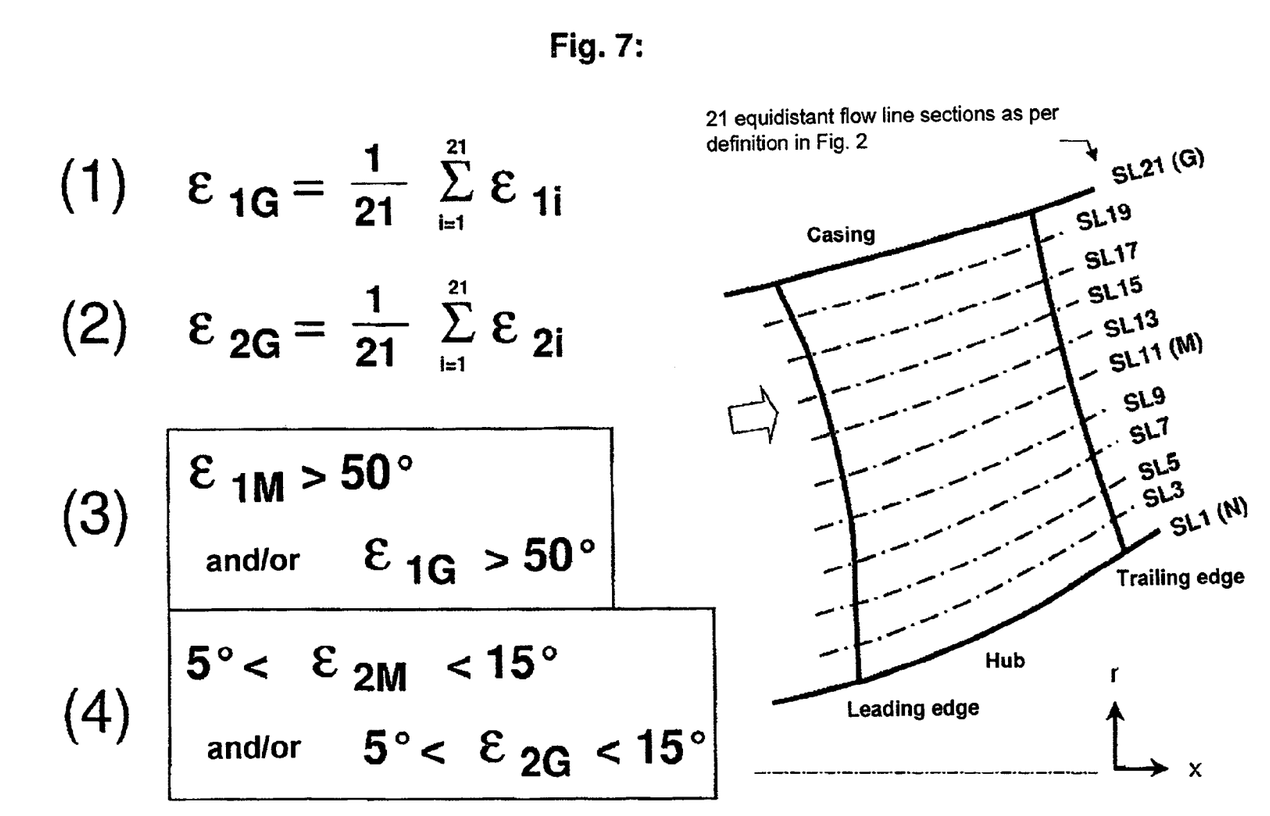
FIG. 7 shows the determination of average values of quantities relevant to the present invention over the rotor blade height on the basis of 21 flow line sections.

Representation of the velocity triangles and the rotor profile form was firstly made here on the center section of the rotor. However, it shall also be made for a number of further flow line sections of the rotor at other blade heights, to also determine, besides the quantities in the center section, the invention-relevant quantities averaged over the blade height. The method for determining the quantities averaged over the blade height is shown in FIG. 7. Accordingly, the averaged rotor entry metal angle $\epsilon_{1G}$ is established by arithmetic averaging of the local values determined at 21 equidistant flow line sections. The averaged rotor exit metal angle $\epsilon_{2G}$ is to be established analogically, see formulas (1) and (2) in FIG. 7.

Figure 8:
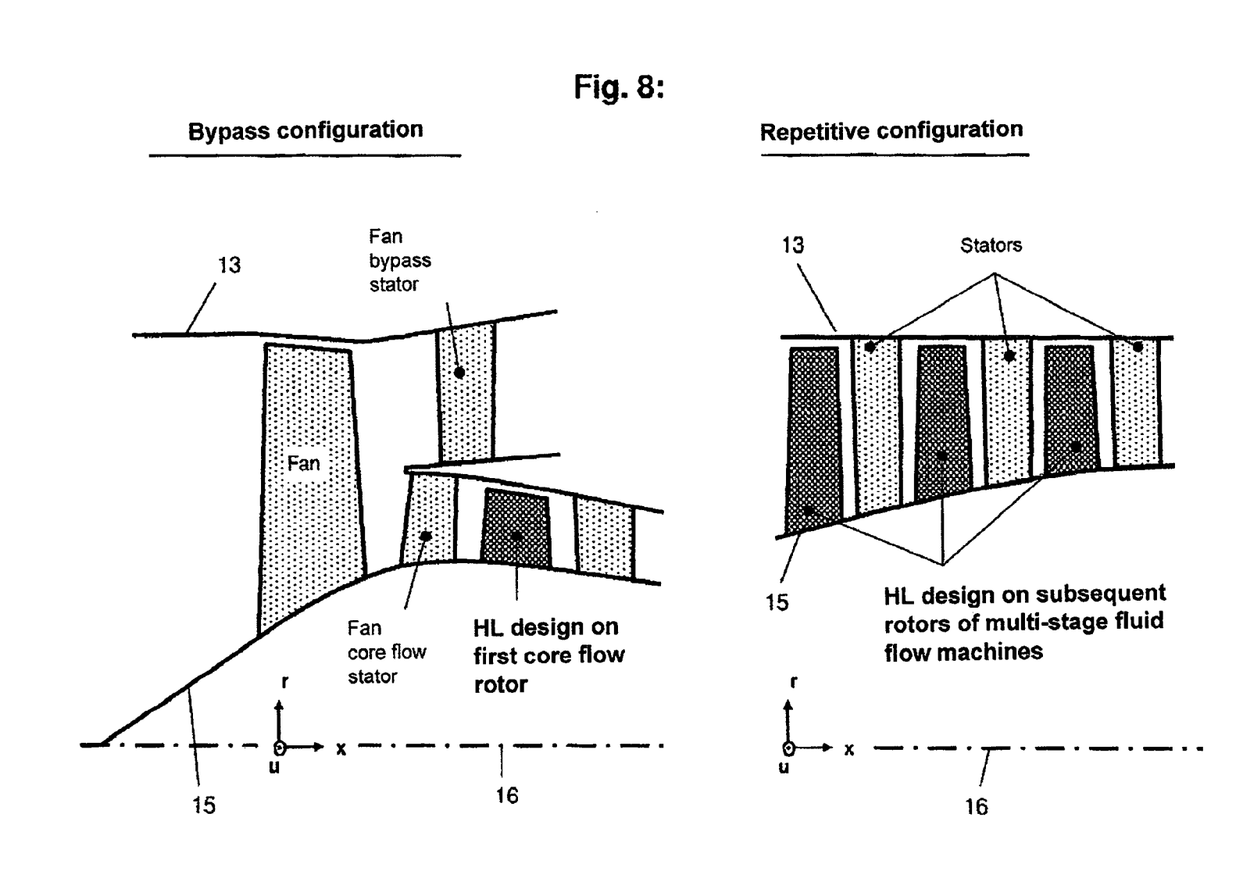
FIG. 8 shows particularly effective configurations in accordance with the present invention with rotors having a small relative exit angle.

The inventive design of a rotor with small exit angle is finally to be described as follows, see formulas (3) and (4) in FIG. 7:

For the entry and exit metal angles the following shall apply:
a) $\epsilon_{1M}$>50 degrees and/or $\epsilon_{1G}$>50 degrees, and
b) 5 degrees<$\epsilon_{2M}$<15 degrees and/or 5 degrees<$\epsilon_{2G}$<15 degrees Particularly effective use of the rotor design with small exit angle is made if, in accordance with the present invention, it is applied to the first rotor arranged in the core flow area of a fluid flow machine with bypass configuration, as shown on the left in FIG. 8.

Further advantages for the operating behavior of individual stages in a multi-stage arrangement result from the repetitive application of the HL rotor design in accordance with the present invention over several stages immediately following each other in the direction of flow, as shown on the right in FIG. 8.

In accordance with the present invention, the following clauses are of particular importance:

Clause 1:

Fluid flow machine with at least one rotor blade row designed for very high work coefficients, which—in its center section and/or averaged over the blade height—provides for low swirl of the relative outflow, characterized in that the respective rotor in its trailing edge area features a mean or averaged exit metal angle of the rotor blades ranging between 5 and 15 degrees.

Clause 2:

Fluid flow machine in accordance with clause 1, with at least one rotor blade row designed for extremely high work coefficients, which—in its center section and/or averaged over the blade height—provides for low swirl of the absolute inflow, characterized in that assemblies upstream of the rotor, if applicable, such as struts or blade rows feature an exit metal angle not exceeding 15 degrees.

Clause 3:

Fluid flow machine in accordance with clause 1 or 2, characterized in that the mean or averaged entry metal angle is at least 50 degrees.

Clause 4:

Fluid flow machine in accordance with clause 1, 2 or 3, characterized in that the inventive rotor design is applied to the first rotor blade row arranged downstream of the fan in the core flow section of an aircraft engine, as viewed in the direction of flow.

Clause 5:

Fluid flow machine in accordance with clause 1, 2 or 3, characterized in that the inventive rotor design is applied to several stages following each other in the direction of flow (repetitive concept).

The high-load rotor design specified in the present invention provides for an as yet unattained level of performance concentration and compactness in fluid flow machines, such as blowers, compressors, pumps and fans. Furthermore, a significantly improved stage tuning is obtained for multi-stage fluid flow machines in part-load operation. In particular on machines bound to run at low speed, for example booster stages of an aircraft engine, loadability can be increased by the factor 2 to 3.

For a given pressure ratio of the fluid flow machine the number of components installed, as compared to conventionally designed boosters, can be reduced by at least 50%, with efficiency being maintained or even improved by up to 2 percent.

A reduction in cost and weight of the engine by approx. 5 percent is achieved. When using the inventive concept in the compressor of an aircraft engine with approx. 25,000 pound thrust, an immediate reduction of the specific fuel consumption of up to 0.5% is achieved.

A further potential lies in the reduced engine length and the reducibility of the running gaps in the core engine sector (high-pressure compressor) resulting therefrom.

LIST OF REFERENCE NUMERALS

10 Fan (first stage)
11 Booster (three stages)
12 High-pressure compressor (ten stages)
13 Casing
14 Annulus duct
15 Rotor drum 1 (hub)
16 Machine axis
17 Rotor drum 2 (hub)
18 Rotor
19 Stator
20 Center meridional flow line
21 Profile skeleton line
22 Blade profile section
23 Rotor center section

What is claimed is:

1. A fluid flow machine, comprising:
at least one rotor blade row having a plurality of rotor blades configured for high work coefficients, each of the rotor blades having an essentially swirl-free relative outflow at least one of a center section and averaged over a blade height, each rotor blade having a trailing edge area orientated in a meridional flow direction to create the essentially swirl-free relative outflow.

2. The fluid flow machine of claim 1, wherein each rotor blade has at least one of a mean and averaged exit metal angle ranging between 5 and 20 degrees with respect to a meridional flow line in its trailing edge area.

3. The fluid flow machine of claim 2, and further comprising a plurality of air directing assemblies positioned upstream of the rotor blades that each have an exit metal angle not exceeding 15 degrees with respect to the meridional flow line.

4. The fluid flow machine of claim 3, wherein each rotor blade has at least one of a mean and an averaged entry metal angle of at least 50 degrees with respect to the meridional flow line.

5. The fluid flow machine of claim 4, wherein the at least one rotor blade row is a first rotor blade row positioned in a flow direction downstream of a fan in a core flow section of an aircraft engine.

6. The fluid flow machine of claim 4, and further comprising a plurality of rotor blade rows configured as the at least one rotor blade row, arranged in stages following each other in a direction of flow.

7. The fluid flow machine of claim 1, and further comprising a plurality of air directing assemblies positioned upstream of the rotor blades that each have an exit metal angle not exceeding 15 degrees with respect to the meridional flow line.

8. The fluid flow machine of claim 7, wherein each rotor blade has at least one of a mean and an averaged entry metal angle of at least 50 degrees with respect to the meridional flow line.

9. The fluid flow machine of claim 8, wherein the at least one rotor blade row is a first rotor blade row positioned in a flow direction downstream of a fan in a core flow section of an aircraft engine.

10. The fluid flow machine of claim 8, and further comprising a plurality of rotor blade rows configured as the at least one rotor blade row, arranged in stages following each other in a direction of flow.

11. The fluid flow machine of claim 1, wherein each rotor blade has at least one of a mean and an averaged entry metal angle of at least 50 degrees with respect to a meridional flow line.

12. The fluid flow machine of claim 11, wherein the at least one rotor blade row is a first rotor blade row positioned in a flow direction downstream of a fan in a core flow section of an aircraft engine.

13. The fluid flow machine of claim 11, and further comprising a plurality of rotor blade rows configured as the at least one rotor row, arranged in stages following each other in a direction of flow.

14. The fluid flow machine of claim 2, wherein each rotor blade has at least one of a mean and an averaged entry metal angle of at least 50 degrees with respect to a meridional flow line.

15. The fluid flow machine of claim 14, wherein the at least one rotor blade row is a first rotor blade, row positioned in a flow direction downstream of a fan in a core flow section of an aircraft engine.

16. The fluid flow machine of claim 14, and further comprising a plurality of rotor blade rows configured as the at least one rotor row, arranged in stages following each other in a direction of flow.

17. The fluid flow machine of claim 1, wherein the at least one rotor blade row is a first rotor blade row positioned in a flow direction downstream of a fan in a core flow section of an aircraft engine.

18. The fluid flow machine of claim 1, and further comprising a plurality of rotor blade rows configured as the at least one rotor row, arranged in stages following each other in a direction of flow.

* * * * *